United States Patent [19]
Yamamoto

[11] Patent Number: 5,469,270
[45] Date of Patent: Nov. 21, 1995

[54] VIDEO EDITING APPARATUS

[75] Inventor: Tomoyuki Yamamoto, Kanagawa, Japan

[73] Assignee: Sony Corporation, Tokyo, Japan

[21] Appl. No.: 214,458

[22] Filed: Mar. 18, 1994

[30] Foreign Application Priority Data

Mar. 26, 1993 [JP] Japan .................................. 5-068353

[51] Int. Cl.$^6$ ..................................................... H04N 5/76
[52] U.S. Cl. .............................. 358/335; 358/311; 360/13
[58] Field of Search ..................................... 358/311, 335, 358/342, 310; 360/13, 14.1, 14.2, 14.3; 395/15, 162, 163, 164, 325, 800, 375

[56] References Cited

U.S. PATENT DOCUMENTS

| | | | |
|---|---|---|---|
| 4,819,087 | 4/1989 | Takeuchi et al. | 360/13 |
| 5,128,672 | 6/1993 | Morgan et al. | 395/162 |
| 5,197,047 | 3/1993 | Witheridge et al. | 369/4 |
| 5,204,969 | 4/1993 | Capps et al. | 395/800 |
| 5,267,092 | 11/1993 | Kizu et al. | 360/14.1 |
| 5,339,393 | 8/1994 | Duffy et al. | 395/161 |

*Primary Examiner*—Tommy P. Chin
*Assistant Examiner*—Robert Chevalier
*Attorney, Agent, or Firm*—Jay H. Maioli

[57] ABSTRACT

A video editing apparatus for editing a plurality of video signals reproduced by a plurality of video reproducing apparatuses in accordance with an edit decision list comprises a list setting portion for setting the edit decision list showing identification data of recording media which are to be used for a video edit and the order of the recording media to be used for the video edit, a memory for storing identification data of recording media mounted on each of the video reproducing apparatuses, a first displaying portion for displaying the names of unmounted recording media which are used in the edit decision list but are not mounted on the video reproducing apparatuses, a second displaying portion for displaying both the names of the video reproducing apparatuses and the names of mounted recording media which are mounted on the video reproducing apparatuses, and a recording media setting portion for selecting one of the unmounted recording media displayed by the first displaying portion, for selecting one of the video reproducing apparatuses to mount the selected unmounted recording medium thereon, and for updating the identification data of the recording media stored in the memory in accordance with the newly made selection.

11 Claims, 6 Drawing Sheets

```
NEW 001
V A12
CUT              POSITION      SRC  P1    IN
R  (A,PECORD)                  XXXX

*P1 (B,0001)                   XXXX
 P2 (C,0002)                   XXXX
 P3 (D,0003)                   XXXX
 P4 (E,0004)  00:00:00:00 SBO
 P5 (F,0005)                   LIVE
 AX1 (,0901)                   LIVE
 AX2 (,0902)
 AX3 (,BLK_)
```

| REEL NAME | UNMOUNTED | SRD |
|---|---|---|
| R  RECORD | | |
| ▶ P1 : 0001 | 1 : 0006 | N |
| P2 : 0002 | 2 : 0007 | N |
| P3 : 0003 | 3 : 0008 | N |
| P4 : 0004 | 4 : 0009 | N |
| P5 : 0005 | 5 : 0010 | |
| AX1 : 0901 | 6 : ...... | |
| AX2 : 0902 | 7 : ...... | |
| AX3 : BLK_ | 8 : ...... | |
| | 9 : ...... | |

REEL              P1 REEL NAME = [0001 ] ?              EFL

| CLEAR ALL F1 | F2 | BACK SPACE F3 | F4 |
| F5 | F6 | F7 | F8 |

VIDEO EDITING APPARATUS

BACKGROUND OF THE INVENTION

1. Field of the Invention

The present invention relates to a video editing apparatus for controlling a plurality of video reproducing apparatuses each having a video signal recorded on a recording medium such as a tape reel mounted thereon. The video editing apparatus edits video signals supplied from the plural video reproducing apparatuses by selectively recording them.

2. Description of the Prior Art

A conventional video editing apparatus controls each of a plurality of video cassette recorders (hereinafter, merely referred to as VCRs) connected therewith to reproduce video signals recorded on the recording media mounted thereon. The video editing apparatus edits the supplied video signals into one program. Two to thirty VCRs usually can be connected with a single video editing apparatus. The video editing apparatus supplies to the VCRs control commands such as "Play" or "Record" and information such as time code or status in order to control the VCRs. The VCRs respond to the control signals supplied from the video editing apparatus.

The video editing apparatus also controls a video switcher and an audio mixer to obtain special effects for video and sound.

This type of video editing apparatus is mainly for professional use. Many types of video editing apparatuses output an edit information to the outside and receive an input edit information from the outside in the form of an edit decision list while the editing apparatus is in a so-called edit decision list mode. When the edit information is newly set or amended, the video editing apparatus displays the edit decision list on its monitor screen in a so-called decision making mode so that desired edit information can be set as an edit decision list. The video editing apparatus carries out this decision making process, using information of tape names rather than the names of VCRs on which the tapes are mounted. When the decision making process is carried out, the tape names are displayed on a monitor screen of the video editing apparatus.

Each VCR to be controlled by the video editing apparatus is named as recorder 1, recorder 2, ... or player 1, player 2, ... while the video editing apparatus carries out the decision making process. After the video editing apparatus makes a satisfactory edit decision list in the decision making process, that setting of the edit information is stored as the updated version of the edit decision list.

The setting of the edit information on the edit decision list does not show where an edit beginning point (an in-point) and an edit ending point (an out-point) of player 1 are, for example, but does show where an edit beginning point and an edit ending point regarding a tape name, that is, the reel name mounted on player 1 are. The video editing apparatus makes the setting of the edit information in this manner because, if there are many source-tapes to be edited, the same tape is not necessarily mounted on the same VCR when the decision making process is made.

The video editing apparatus carries out the decision making process for deciding an editing order in an interactive way. However, when a so-called unmounted reel is found, that is, when a tape used in the edit decision list is not mounted on any VCR, not all the edit information on the edit decision list can be subject to the decision making process. In this situation, the video editing apparatus displays an error message such as "Unmounted Tape XXXX", for example, and induces an operator to mount the unmounted tape. This error message indicates the names of tapes necessary to carry out the editing according to the edit decision list.

However, the error message displayed on the monitor screen disappears when the operator of the video editing apparatus starts to do something in this decision making mode. Although the operator begins tape setting operation to mount a tape which is unmounted, the name of the unmounted tape becomes unknown to the operator because the error message has already disappeared. For this reason, the operator has to make a note of the error message indicating the names of the unmounted tapes. In addition, the operator has to input the names of the unmounted tapes in the decision making mode letter by letter by using a key board.

Though a tape name was conventionally expressed by a three-digit number, it has been recently expanded to six-digit alphanumeric characters. Therefore, when the number of tapes which can be mounted increases, it is very hard for the operator to memorize the corresponding six-digit alphanumeric characters for the tapes and to enter them by using the key board.

OBJECT AND SUMMARY OF THE INVENTION

Considering the above-explained problems, an object of the present invention is to provide a video editing apparatus for displaying a list of unmounted recording media in an interactive way and for enabling easy selection of recording media which are currently mounted on video reproducing apparatuses but can be removed.

In accordance with an aspect of the present invention, a video editing apparatus controls a plurality of video reproducing apparatuses connected therewith and edits a plurality of video signals supplied from the video reproducing apparatuses, wherein the video editing apparatus includes an unmounted recording media name displaying circuit for displaying the names of unmounted recording media which are not mounted on the video reproducing apparatuses connected with the video editing apparatus, a mounted recording media name displaying circuit for displaying both the names of the video reproducing apparatuses connected with the video editing apparatus and the names of mounted recording media which are mounted on the video reproducing apparatuses, and a reel selecting circuit for selecting one of the unmounted recording media displayed by the unmounted recording media name displaying circuit and for selecting one of the video reproducing apparatuses to mount the selected unmounted recording medium thereon, whereby the above explained problems will be resolved.

The video editing apparatus terminates the display by the unmounted recording media name displaying circuit when all of the unmounted recording media displayed by the unmounted recording media name displaying circuit are selected and mounted on the video reproducing apparatuses.

In the video editing apparatus, the selection of the unmounted recording medium displayed by the unmounted recording media name displaying circuit and the selection of the video reproducing apparatus displayed by the mounted recording media name displaying circuit are carried out by moving a cursor.

Because a video editing apparatus according to the present invention has an unmounted recording media name displaying circuit and a mounted recording media name displaying circuit, a user can distinguish the mounted recording media from the unmounted recording media and easily set a desired unmounted recording medium on a desired video reproducing apparatus without necessity of taking a note of the names of the unmounted recording media.

When all the unmounted recording media are selected and the video reproducing apparatuses onto which the selected unmounted recording media to be set are to be selected, the unmounted recording media name displaying circuit terminates the display of the names of unmounted recording media which are displayed in a window on the monitor screen.

A recording medium to be mounted can be selected without necessity of using the input keys, but rather by moving the cursor to the selected unmounted recording medium displayed by the unmounted recording media name displaying circuit.

DETAILED DESCRIPTION OF A PREFERRED EMBODIMENT

Referring to the drawings, an embodiment of a video editing apparatus according to the present invention will be explained hereinafter.

Figure 1A:
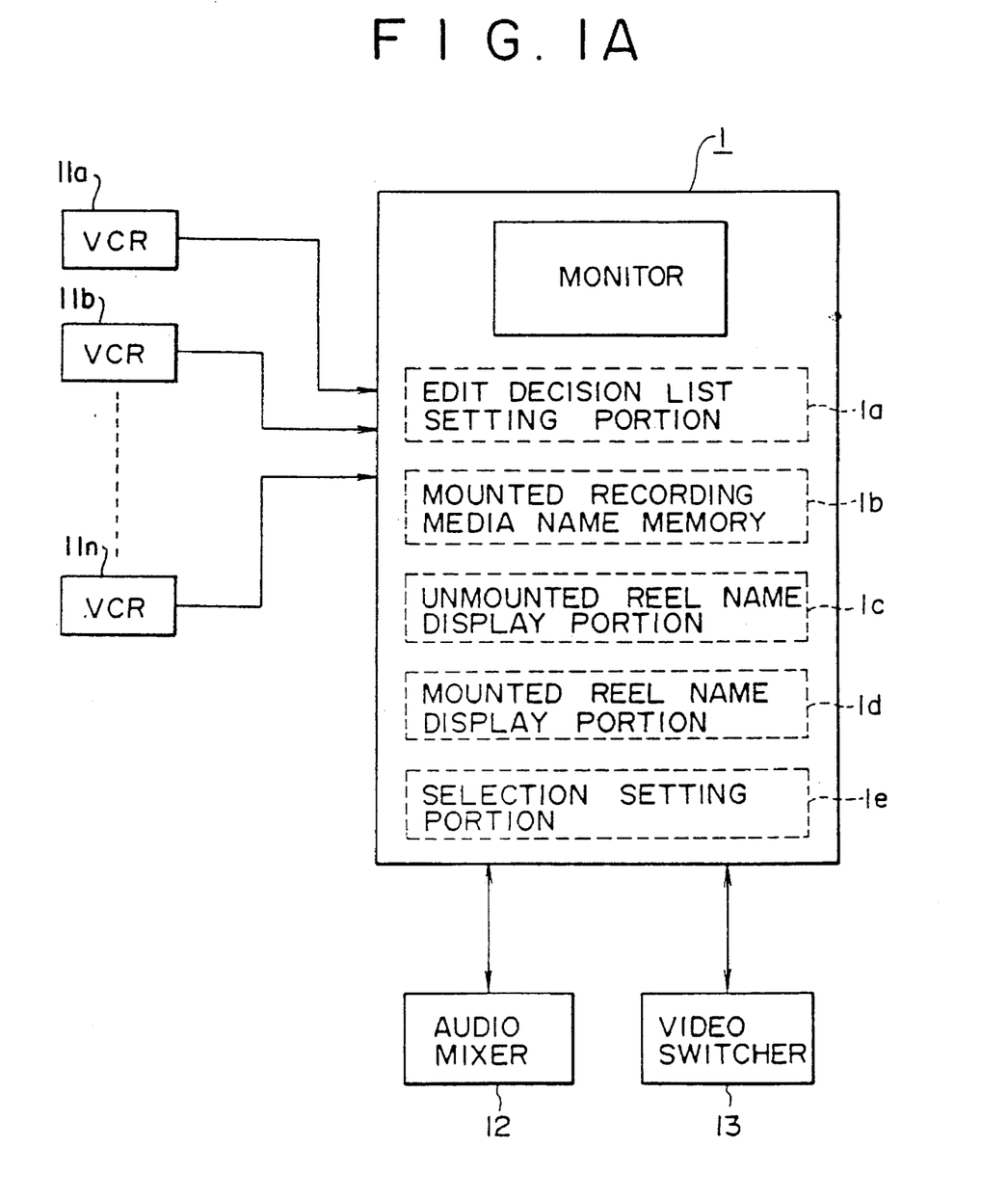
FIG. 1A shows a video editing system comprising a video editing apparatus according to the present invention, plural external video tape recorders, a video switcher and an audio mixer.

FIG. 1A shows a video editing system including a video editing apparatus 1 according to the present invention, a plurality of video cassette recorders 11a–11n, an audio mixer 12 and a video switcher 13. Recording media used in the video editing system are, for example, video tape cassettes.

As shown in FIG. 1A, video editing apparatus 1 is connected with plural video cassette recorders 11a–11n (hereinafter referred to as VCR). Video editing apparatus 1 controls video tape recorders 11a–11n, audio mixer 12 and video switcher 13 which are connected therewith. Each of these external apparatuses works in accordance with control signals of video editing apparatus 1 and supplies data to video editing apparatus 1. Many types of video editing apparatus can receive from and supply to the outside edit information in the form of an edit decision list (hereinafter referred to as EDL). There are several formats for the EDL. An example of the format is shown in Table 1.

TABLE 1

| EDT REL | MODE | TYP | P S | T | P-VTR IN | P-VTR OUT | P-VTR IN | P-VTR OUT |
|---------|------|-----|-----|---|----------|-----------|----------|-----------|
| BLOCK 001 | | | | | | | | |
| 001 001 | ASSY1 | C | | | 00:00:00:00 | 00:00:02:00 | 00:00:00:00 | 00:00:02:00 |
| 002 001 | ASMBL | C | | | 00:00:02:00 | 00:00:04:00 | 00:00:02:00 | 00:00:04:00 |
| 002 002 | ASMBL | D | | 02:00 | 00:00:00:00 | 00:00:02:00 | 00:00:04:00 | 00:00:06:00 |
| 003 001 | V | C | | | 00:00:06:00 | 00:00:08:00 | 00:00:06:00 | 00:00:08:00 |
| 003 002 | V | W | 0010 | 02:00 | 00:00:04:00 | 00:00:06:00 | 00:00:08:00 | 00:00:10:00 |
| 004 001 | A1 | KB | 99 | | 00:00:10:00 | 00:00:14:00 | 00:00:10:00 | 00:00:14:00 |
| 004 002 | A1 | KI | 0080 | 00:00 | 00:00:06:00 | 00:00:08:00 | 00:00:12:00 | 00:00:14:00 |
| 005 001 | A2 | KB | 99 | | 00:00:14:00 | 00:00:18:00 | 00:00:14:00 | 00:00:18:00 |
| 005 002 | A2 | KI | 0080 | 02:00 | 00:00:08:00 | 00:00:10:00 | 00:00:16:00 | 00:00:18:00 |
| 006 001 | VA1 | KB | 99 | | 00:00:18:00 | 00:00:22:00 | 00:00:18:00 | 00:00:22:00 |
| 006 002 | VA1 | KI | 0420 | 02:00 | 00:00:10:00 | 00:00:12:00 | 00:00:20:00 | 00:00:22:00 |
| 007 001 | V | KBF | 99 | | 00:00:22:00 | 00:00:26:00 | 00:00:22:00 | 00:00:26:00 |
| 007 002 | V | KI | 0080 | 02:00 | 00:00:12:00 | 00:00:16:00 | 00:00:22:00 | 00:00:26:00 |
| 008 001 | A1A2 | KB | 99 | | 00:00:26:00 | 00:00:30:00 | 00:00:26:00 | 00:00:30:00 |
| 008 002 | A1A2 | KD | 0080 | 00:00 | 00:00:16:00 | 00:00:18:00 | 00:00:26:00 | 00:00:28:00 |
| 009 001 | VA1A2 | KB | 99 | | 00:00:30:00 | 00:00:34:00 | 00:00:30:00 | 00:00:34:00 |
| 009 002 | VA1A2 | KD | 0080 | 02:00 | 00:00:20:00 | 00:00:22:00 | 00:00:30:00 | 00:00:32:00 |
| 010 001 | VA1A2 | KB | 99 | | 00:00:34:00 | 00:00:38:00 | 00:00:34:00 | 00:00:38:00 |
| 010 002 | VA1A2 | KD | 0410 | 02:00 | 00:00:24:00 | 00:00:26:00 | 00:00:34:00 | 00:00:36:00 |
| 011 001 | VA1A2 | KBF | 99 | | 00:00:38:00 | 00:00:42:00 | 00:00:38:00 | 00:00:42:00 |
| 011 002 | VA1A2 | KD | 0080 | 02:00 | 00:00:28:00 | 00:00:30:00 | 00:00:38:00 | 00:00:40:00 |
| 012 001 | VA1A2 | KB | 50 | | 00:00:42:00 | 00:00:46:00 | 00:00:42:00 | 00:00:46:00 |
| 012 002 | VA1A2 | KI | 0000 | 00:00 | 00:00:32:00 | 00:00:34:00 | 00:00:44:00 | 00:00:46:00 |
| 013 001 | VA1A2 | KB | 60 | | 00:00:46:00 | 00:00:50:00 | 00:00:46:00 | 00:00:50:00 |
| 013 002 | VA1A2 | KI | 0011 | 02:00 | 00:00:34:00 | 00:00:36:00 | 00:00:48:00 | 00:00:50:00 |
| 013 | GPI 1 | | RA | | | | 00:00:46:00 | |
| 013 | GPI 2 | | RA | | | | 00:00:47:00 | |
| 013 | GPI 3 | | RA | | | | 00:00:48:00 | |
| 014 001 | | KBF | 25 | | 00:00:50:00 | 00:00:54:00 | 00:00:50:00 | 00:00:54:00 |
| 014 002 | | KI | 0030 | 02:00 | 00:00:36:00 | 00:00:40:00 | 00:00:50:00 | 00:00:54:00 |
| 015 001 | | KB | 60 | | 00:00:54:00 | 00:00:56:00 | 00:00:54:00 | 00:00:58:00 |
| | DM+050 | | | | | | | |
| 015 002 | VA1A2 | KD | 0015 | 00:00 | 00:00:40:00 | 00:00:42:00 | 00:00:54:00 | 00:00:56:00 |
| 015 | GPI 1 | | | | | | 00:00:54:00 | |
| 016 001 | VA1A2 | KB | 40 | | 00:00:58:00 | 00:01:02:00 | 00:00:58:00 | 00:01:02:00 |

TABLE 1-continued

| EDT REL | MODE TYP | P S | T | P-VTR IN | P-VTR OUT | P-VTR IN | P-VTR OUT |
|---------|----------|------|-------|-------------|-------------|-------------|-------------|
| 016 002 | VA1A2 KD | 0032 | 02:00 | 00:00:44:00 | 00:00:46:00 | 00:00:58:00 | 00:01:00:00 |
| 016     | GPI 2    | RA   |       |             |             | 00:00:58:00 |             |
| 017 001 | VA1A2 KBF | 45  |       | 00:01:02:00 | 00:01:06:00 | 00:01:02:00 | 00:01:06:00 |
| 017 002 | VA1A2 KD | 0017 | 02:00 | 00:00:48:00 | 00:00:50:00 | 00:01:02:00 | 00:01:04:00 |
| 018 001 | VA1A2 FM |      |       | 00:01:06:00 | 00:01:10:00 | 00:01:06:00 | 00:01:10:00 |
| 018 002 | VA1A2 FM |      |       | 00:00:00:00 | 00:00:04:00 | 00:01:05:00 | 00:01:10:00 |
| 018 BLK | VA1A2    |      |       | 00:00:00:00 | 00:00:04:00 | 00:01:06:00 | 00:01:10:00 |
| 019 001 | VA1A2 C  |      | +01:00 | 00:02:10:00 | 00:02:15:00 | 00:01:10:00 | 00:01:15:00 |
|         |          |      |       |             |             | TIME        | 00:01:15:00 |
| END     |          |      |       |             |             | TOTAL TIME  | 00:01:15:00 |

An area [EDT] in Table 1 shows edit members. An area [REL] shows reel numbers, that is, the names of tape cassettes. Often, the same numbers are assigned to two lines as shown in Table 1. For example, there are two lines having edit number 002. Data provided in the first line means that a video signal reproduced from the position between 02:00 and 04:00 of reel 001 is to be recorded at the position between 02:00 and 04:00 of the recording reel (which will be a final product). An area [MODE] shows editing modes; for example, [VA1A2] at edit number 009 means an insert editing of V, A1 and A2. Areas [TYP] [P S] [T] show effect data. [TYP] shows a type of the effect. First lines of area [P S] show a size. [KB 40] at edit number 016, for example, means that the size is equal to 40%. Data in second lines of area [P S] show pattern numbers. An area [T] shows a transition and data [02:00] means two seconds.

[P-VCR IN] and [P-VCR OUT] respectively show an edit beginning point and an edit ending point of reproducing VCRs. [R-VCR IN] and [R-VCR OUT] respectively show an edit beginning point and an edit ending point of a recording VCR. Data of reels, modes and time of the video editing are set according to an EDL format like this.

In video editing apparatus 1, it is called decision making (hereinafter referred to as DM) when an operator examines and determines edit data. A EDL which is being initially made in the DM mode is called a "New Page". Then, the New Page is stored as an EDL in the EDL mode. A DM screen which is recalled from the stored EDL to amend the data of the EDL is called a "Recall Page". Storing the data amended in the DM mode as a new EDL is called "Store". On the contrary, recalling the EDL into the DM screen is called "Recall". The data is displayed in the DM mode on a monitor screen of video editing apparatus 1. The above setting operation of the edit decision list is made by an edit decision list setting portion 1a of video editing apparatus 1.

Video editing apparatus 1 also stores data showing what reel (tape cassette) is mounted on each VCR connected to video editing apparatus 1. The data is stored in a mounted recording media name memory 1b of video editing apparatus 1. But the video editing apparatus itself does not have a sensor to find the reel name mounted on each VCR. Rather, while the operator inputs data about which reel is mounted on which VCR, the operator must physically mount the reels on the corresponding VCRs in accordance with the input data.

Figure 1B:
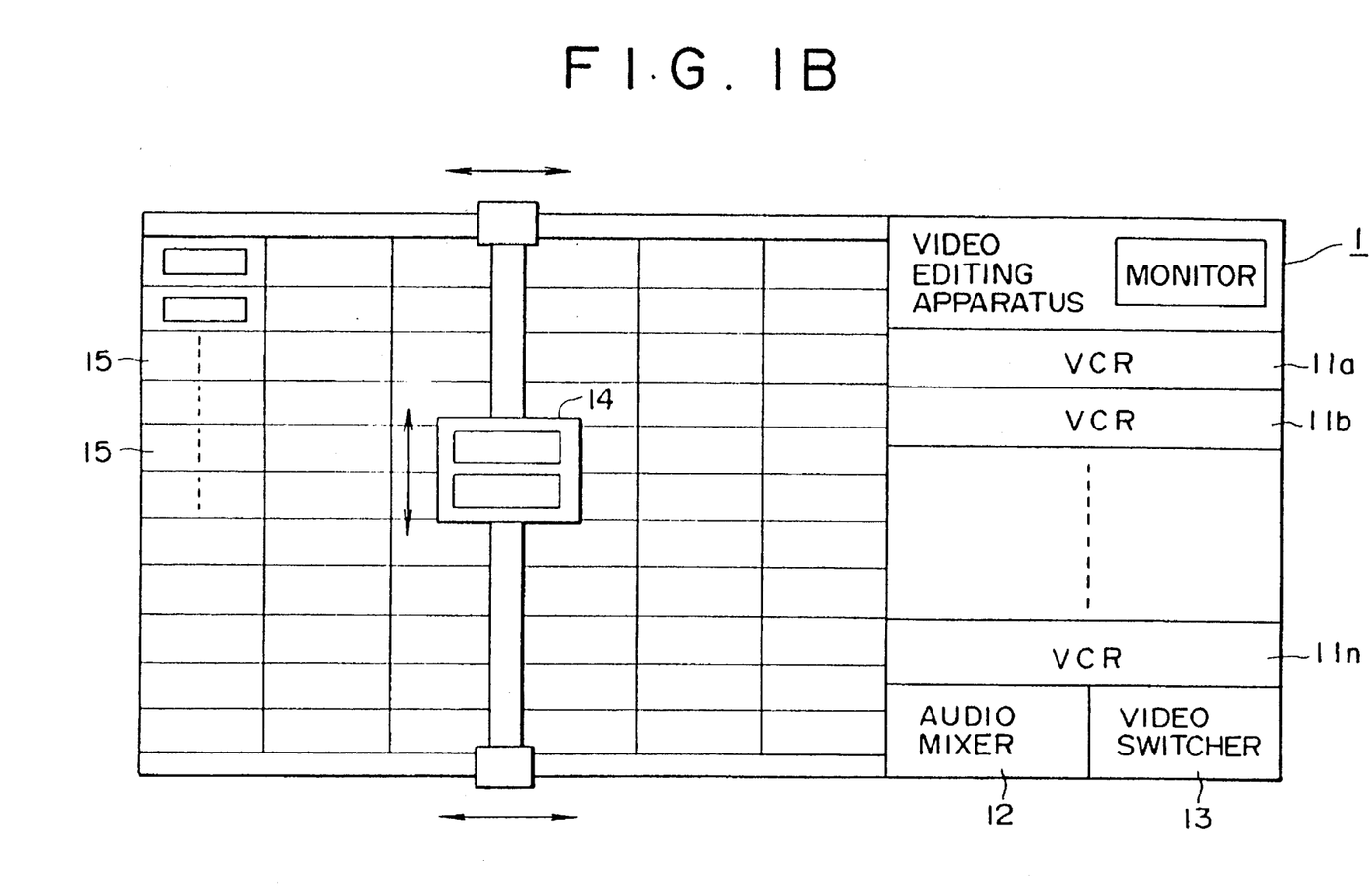
FIG. 1B shows a video editing cart machine system comprising a video editing apparatus according to the present invention.

However, as shown in FIG. 1B, the video editing system can be incorporated in a cart machine (a cassette library system) in which a carriage 14 transports the reels between VCRs 11a–11n and reel storage bins 15 and/or between VCRs 11a–11n and bar code sensors provided on carriage 14 sense a bar code attached on each reel to determine the reel name, for example. Video editing apparatus 1 is the same as shown in FIG. 1A. In this case, the video editing system automatically mounts the identified reels on the corresponding VCRs in accordance with the data input by the operator. Therefore, after the operator inputs such data, he does not need to physically mount the reels.

If there are unmounted reels (reels which are used in the EDL, but nevertheless are not mounted on any VCR) when the EDL is recalled, video editing apparatus 1 displays an error message to induce the operator to mount the unmounted reel on one of the VCRs. When the operator makes video editing apparatus 1 in an interactive mode to select reels, video editing apparatus 1 erases the error message. To take necessary steps in response to the error message, the operator must take a note of the error message indicating the name of the unmounted reels and enter the words taken in the note by using a key board letter by letter.

To resolve this problem, video editing apparatus 1 as shown in FIG. 1A controls a mounted reel name displaying portion 1d to display the names of reels which have been already mounted on the VCRs connected to video editing apparatus 1. Video editing apparatus 1 also controls an unmounted reel name displaying portion 1c to simultaneously display the names of the unmounted reels, if any. Mounted reel name displaying portion 1d displays the names of the VCRs connected with video editing apparatus 1 and the names of the recording media mounted on the VCRs. Unmounted reel name displaying portion 1c displays the names of the reels which are not mounted on the VCRs connected with video editing apparatus 1.

Video editing apparatus 1 has a reel setting portion 1e for selecting any of the unmounted reels displayed by unmounted reel name displaying portion 1c and selecting any of the VCRs on which the selected unmounted reels are to be mounted.

Reel setting portion 1e displays a list of the unmounted reels which are unmounted on the VCRs connected with video editing apparatus 1 and a list of the VCRs, respectively. Then, reel setting portion 1e uses as selection data alphanumeric characters at the position identified by the cursor. Therefore, the operator does not have to use the key board to enter the selection data letter by letter.

Figure 2:
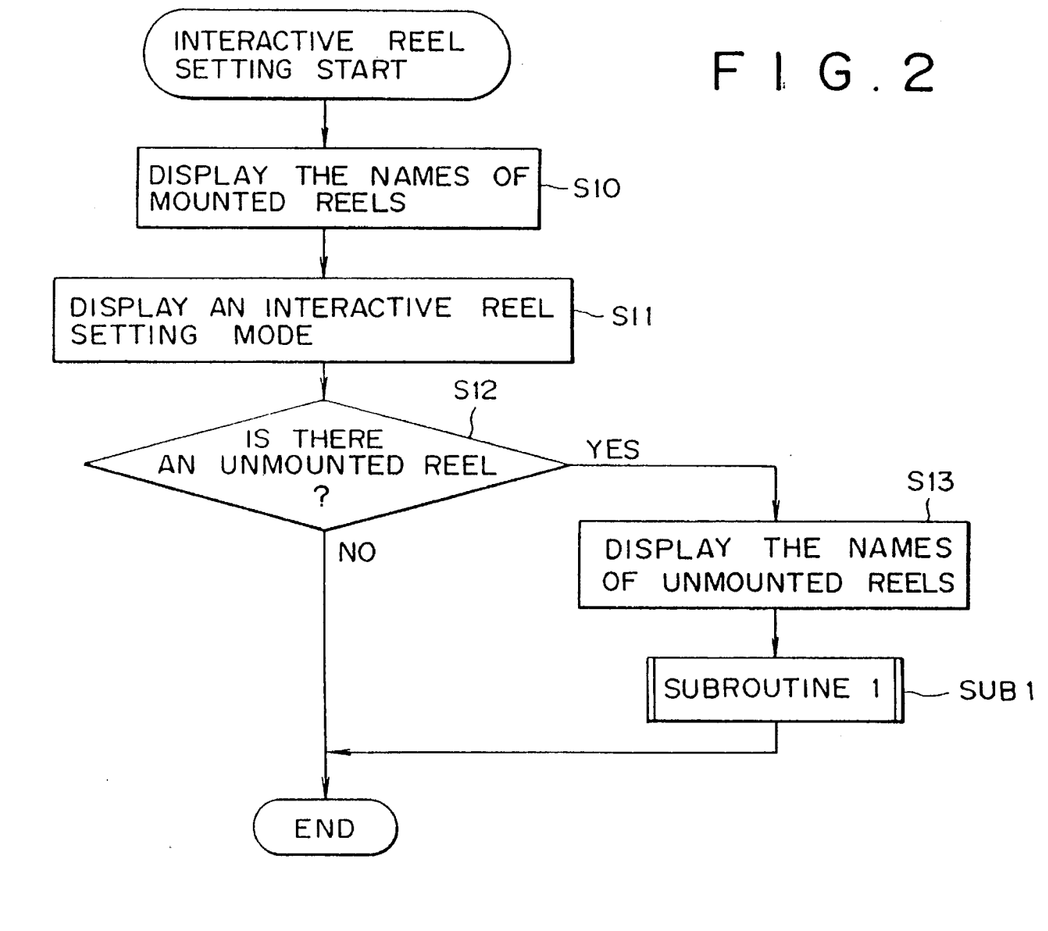
FIG. 2 is a flow chart for explanation of operations of an interactive mode for reel setting in the video editing apparatus.
Figure 3:
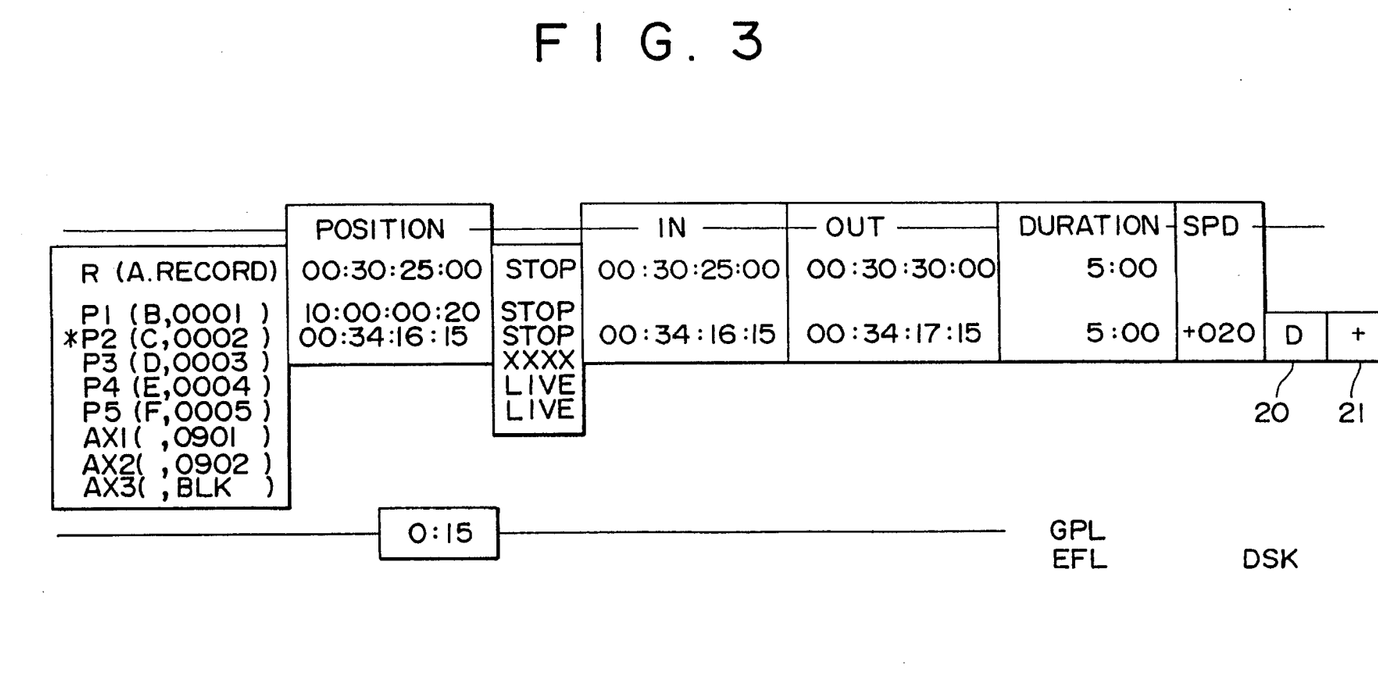
FIG. 3 shows a display on a screen in an edit decision list mode.
Figure 4:
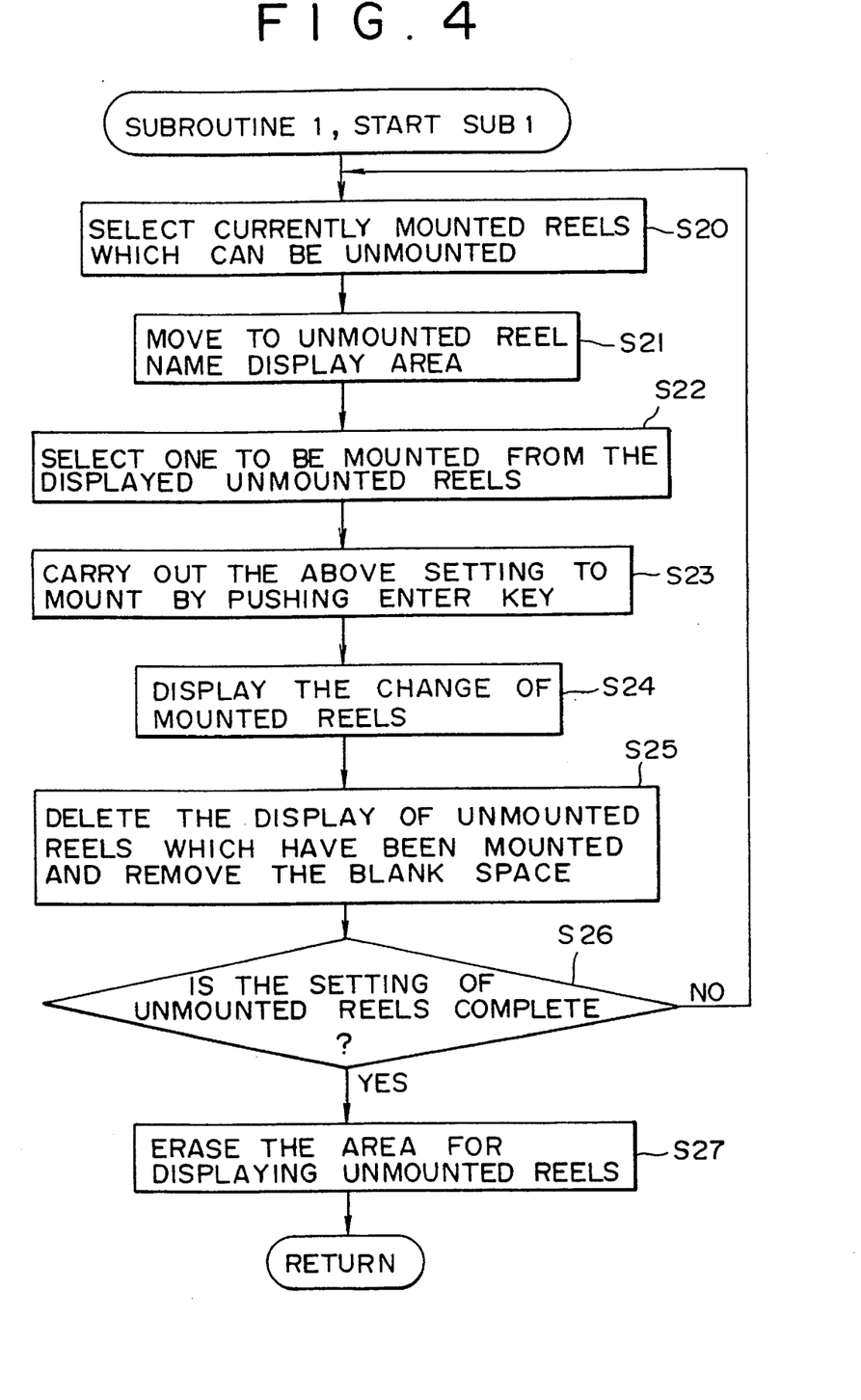
FIG. 4 is a flow chart for explanation of steps for selecting an unmounted reel in subroutine SUB1.
Figure 5:
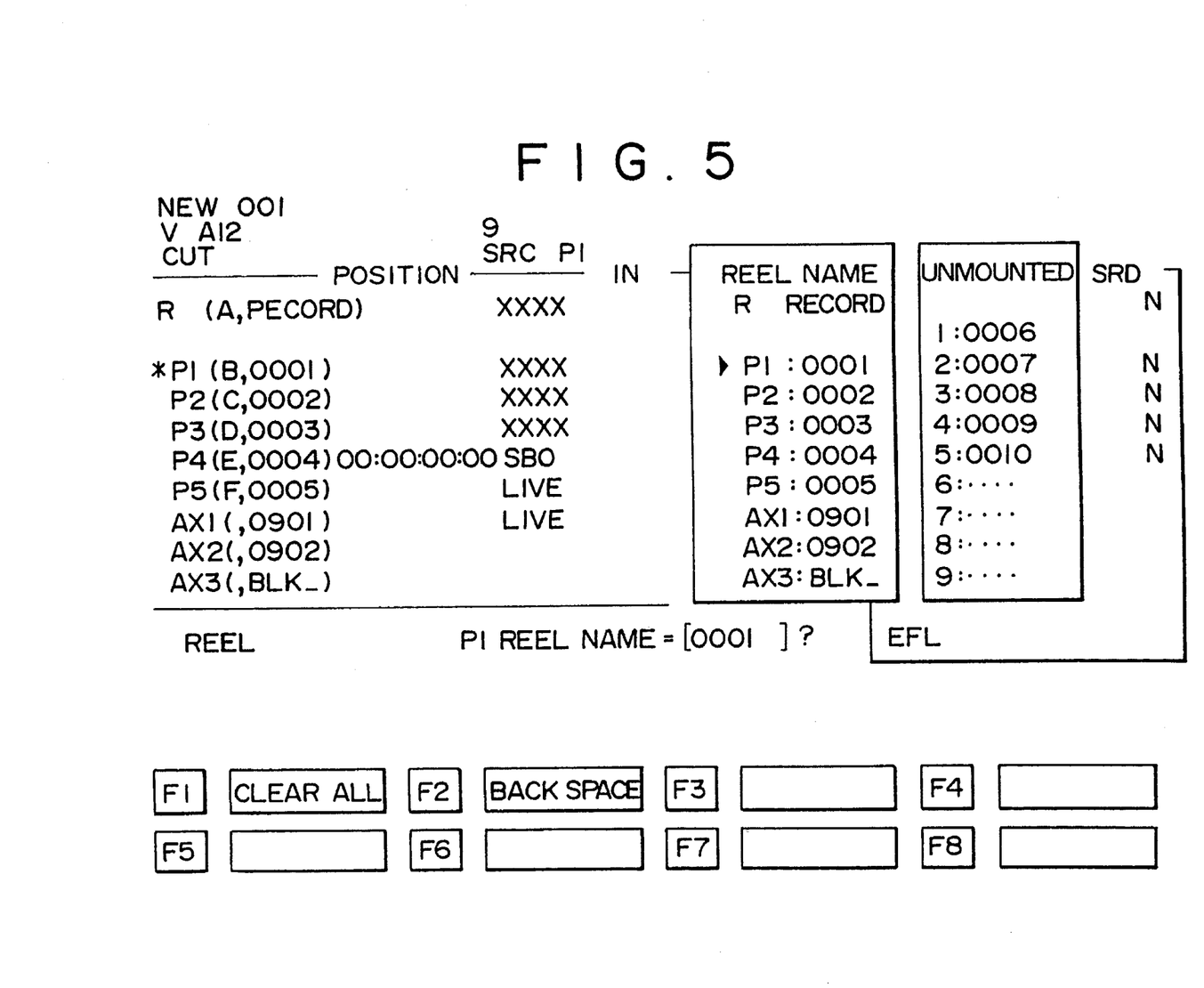
FIG. 5 shows a display on a screen during the selection of the unmounted reel to be mounted on the video editing apparatus.

Referring to flow charts as shown in FIGS. 2 and 4 and to actual displays on the screen as shown in FIGS. 3 and 5, actual operation of the video editing will be explained hereinafter. Video editing apparatus 1 starts an interactive mode for reel setting. In step S10, mounted reel displaying portion 1d of video editing apparatus 1 displays the names of the reels which have been already mounted on the VCRs.

In step S11, video editing apparatus 1 shows a display as shown in FIG. 3, in the interactive mode for reel setting. A symbol [*] means source selection indication. An area [R] shows a recorder indication. [A] of (A, RECORD), [B] of (B, 0001), [C] of (C, 0002) . . . indicate ports of video editing apparatus 1. In this embodiment, video editing apparatus 1 has five ports A to F (kinds of terminals) through which the external VCRs can be connected with video editing apparatus 1. [RECORD] of (A, RECORD), [0001] of (B, 0001), [0002] of (C, 0002) . . . indicate reel names. A [POSITION] column indicates the current positions of the VCRs. An area next to the [POSITION] column to the right indicates the current conditions of the VCRs. Areas [IN] and [OUT] respectively show so-called in-points as edit beginning points of the corresponding reels and so-called out-points as edit ending points of the corresponding reels.

An area [DURATION] indicates the duration (operation period) of the VCRs. An area [SPD] indicates the initial tape running speeds of the VCRs. Areas 20 and 21 which are hidden behind indicate a frame control information and a color frame information, respectively. A Display [0:15] means a relative position of the current position with respect to the in-point. In this manner, the screen display is made in the reel setting mode. After that display has been made, step S12 is carried out.

In step S12, whether there is an unmounted reel is determined. If there is an unmounted reel (that is, if the determination in step S11 is Yes), step S13 is carried out. In step S13, unmounted reel name displaying portion 1c displays the names of the unmounted reels (see FIG. 5). After the names of the unmounted reels are displayed in step S13, subroutine SUB1 as shown in FIG. 4 is carried out to deal with the unmounted reels. When there is no unmounted reel (that is, the determination in step S11 is No), the interactive mode for reel setting will end.

Subroutine SUB1 is a process to select which unmounted reel is to be mounted on one of the VCRs. When this process is made, the screen looks like one as shown in FIG. 5.

In step S20, the names of reels which are currently mounted are displayed as a pop-up guide in a window over the display of FIG. 3. Among the displayed reels, a reel which can be unmounted is selected by the operator. This selection of the reel to be unmounted is carried out by positioning a triangle-shape cursor (see FIG. 5). The cursor can be moved by using two up-down shift keys of video editing apparatus 1. In FIG. 5, VCR [P1] is selected as a reel name. By using the interactive mode for reel setting, player VCR 1 selected by the cursor and its reel name will be displayed like

REEL P1 REEL NAME=[0001]

in a blank space of the display as shown in FIG. 5, without necessity of entering the player and the reel names letter by letter.

In step S21, the names of the unmounted reels are displayed next to the pop-up guide. The cursor is moved to the display area for the unmounted reels. The cursor can be moved by using two shift keys in the left and right directions.

In step S22, reels to be mounted are selected from the unmounted reels then displayed. The cursor can be moved by using the two up-down shift keys. Though not shown in the drawings, in video editing apparatus 1, an unmounted reel which is to be mounted on player 1 is selected by using the cursor. If there is no reel which is unmounted, no name is displayed by unmounted reel name displaying portion 1c.

In step S23, if the above selection is OK, the operator pushes an enter key. By this entry, the reel setting according to the selection is excused regarding the reels selected in steps S20 and S22. In step S20, video editing apparatus 1 makes unmounted the mounted reels which can be unmounted, and mounts the unmounted reels selected in step S23 on the VCRs from which the reels have been already removed.

Since the reel setting will not be complete until the enter key is pushed, another selection, if desired, could be made, returning to step S21 again.

In step S24, following the execution in step S23, displays of the names of the VCRs on which reels are newly mounted and of the names of the reels are updated.

In step S25, display areas for the unmounted reels which have been already selected to be mounted are deleted so that no blank space is left.

In step S26, it is determined whether selection of the unmounted reels to be mounted is complete. If there still remains an unmounted reel to be mounted (that is if the determination in step S26 is No), the above explained processes are repeated, returning to step S20. When the selection of the unmounted reels to be mounted is all complete, (that is, when the determination is step S26 is Yes), step S27 will be carried out.

In step S27, unmounted reel name displaying portion 1a closes the window area for displaying the names of the unmounted reels. In this manner, the display of the names of the unmounted reels are erased when the selection setting is complete. After this process, subroutine SUB1 returns to the main routine.

After subroutine SUB1 has been complete, the main routine goes to "END" and the interactive mode for reel setting will be finished.

In the interactive mode for reel setting, the mounted reels subject to unmounting and the unmounted reels are simultaneously displayed so that the operator can easily select the unmounted reels to be mounted while he can watch the names of the unmounted reels displayed by the error message without the inconvenience of having to take note of the names.

The name of the VCR from which a currently mounted reel thereon can be unmounted and the name of the mounted reel are displayed and selected by positioning the cursor at the position of the VCR to be selected, without using the key board to enter the names, so that the operator can easily set the selection with ease of the operation improved.

Further, the names of the mounted reels and of the unmounted reels continue to be displayed in the interactive reel setting mode until there are no unmounted reels any more. Therefore, the setting of reels can be made with certainty. The window for displaying is closed upon the completion of the setting of the unmounted reels so that the window may not disturb the subsequent displays.

As explained above, a video editing apparatus according to the present invention controls a plurality of video reproducing apparatuses connected therewith and edits a plurality of video signals, wherein the video editing apparatus includes an unmounted recording media name displaying circuit for displaying the names of unmounted recording media which are not mounted on the video reproducing apparatus connected with the video editing apparatus, a mounted recording media name displaying circuit for displaying both the names of the video reproducing apparatuses connected with the video editing apparatus and the names of the mounted recording media which are mounted on the video reproducing apparatus, and a reel setting circuit for selecting one of the unmounted recording media displayed by means of the unmounted recording media name displaying circuit and for selecting one of the video reproducing apparatuses to mount the selected unmounted recording medium thereon, whereby the operator can easily select the unmounted reels to be mounted while he can watch the names of the unmounted reels displayed by the error message without the inconvenience of having to take note of the names.

The video editing apparatus terminates the display by the unmounted recording media name displaying circuit when all of the unmounted recording media displayed by the unmounted recording media name displaying circuit are selected and mounted on the video reproducing apparatuses. Therefore, the names of the mounted reels and of the unmounted reels continue to be displayed in the interactive reel setting mode until there are no unmounted reels so that the setting of the reels can be made with certainty. The window for displaying is closed upon the completion of the setting of the unmounted reels so that the window may not disturb the subsequent displays.

The selection of the unmounted recording medium displayed by the unmounted recording media name displaying circuit and the selection of the video reproducing apparatus displayed by means of the mounted recording media name displaying circuit are carried out by moving a cursor on a monitor screen. The name of the VCR from which a currently mounted reel can be unmounted and the name of the mounted reel are displayed and selected by positioning the cursor at the position of the VCR selected, without using the key board to enter the names, so that the operator can easily set the selection of the reels.

Although the tape cassettes are used as recording media in the above embodiment, any type of recording media such as optical disks, magnetic disks, opto-magnetic disks, optical tapes and so on can be used as recording media.

What is claimed is:

1. A video editing apparatus for controlling a plurality of video reproducing apparatuses connected thereto and for editing a plurality of video signals supplied from said plurality of video reproducing apparatuses, said video editing apparatus comprising:

unmounted recording media name displaying means for displaying names of unmounted recording media which are not mounted on said plurality of video reproducing apparatuses connected to said video editing apparatus;

mounted recording media name displaying means for displaying both names of said plurality of video reproducing apparatuses connected to said video editing apparatus and names of mounted recording media which are mounted on said plurality of video reproducing apparatuses; and recording media setting means for selecting one of said unmounted recording media corresponding to a name displayed by said unmounted recording media name displaying means, and for selecting one of said plurality of video reproducing apparatuses to mount the selected unmounted recording medium thereon.

2. A video editing apparatus according to claim 1, wherein said unmounted recording media name displaying means terminates a display of the names of the unmounted recording media when all of said unmounted recording media corresponding to the names displayed by said unmounted recording media name displaying means are selected and mounted on said plurality of video reproducing apparatuses.

3. A video editing apparatus according to claim 1, wherein the selected one of said unmounted recording media and the selected one of said plurality of video reproducing apparatuses are selected by moving a cursor to a corresponding name displayed by said unmounted recording media name displaying means and by said mounted recording media name displaying means, respectively.

4. A video editing apparatus according to claim 2, wherein the selected one of said unmounted recording media and the selected one of said plurality of video reproducing apparatuses are selected by moving a cursor to a corresponding name displayed by said unmounted recording media name displaying means and by said mounted recording media name displaying means, respectively.

5. A video editing apparatus for controlling a plurality of video reproducing apparatuses connected thereto and a video recording apparatus connected thereto so that a plurality of video signals reproduced by said plurality of video reproducing apparatuses are edited and recorded by said video recording apparatus in accordance with an edit decision list, said video editing apparatus comprising:

edit decision list setting means for setting said edit decision list showing identification data of recording media which are to be used for a video edit and an order of said recording media to be used for the video edit;

mounted recording media name memory means for storing identification data of recording media mounted on each of said plurality of video reproducing apparatuses;

unmounted recording media name displaying means for displaying names of unmounted recording media which are contained in said edit decision list but are not mounted on said plurality of video reproducing apparatuses;

mounted recording media name displaying means for displaying both names of said plurality of video reproducing apparatuses and names of said mounted recording media which are mounted on said plurality of video reproducing apparatuses; and recording media setting means for selecting one of said unmounted recording media corresponding to a name displayed by said unmounted recording media name displaying means, for selecting one of said plurality of video reproducing apparatuses to mount the selected unmounted recording medium thereon, and for updating the identification data of the recording media stored in said mounted recording media name memory means in accordance with the selection of the unmounted recording medium and of the reproducing apparatus on which said unmounted recording medium is mounted.

6. A video editing apparatus according to claim 5, wherein said unmounted recording media name displaying means and said mounted recording media name displaying means simultaneously display names on a single screen of the video editing apparatus.

7. A video editing apparatus according to claim 5, wherein said recording medium is a cassette tape.

8. A video editing system, comprising:

a plurality of video reproducing apparatuses for reproducing video signals recorded on recording media mounted thereon;

a video recording apparatus for recording said video signals reproduced by said plurality of video reproducing apparatuses; and a video editing apparatus for controlling said video reproducing apparatuses and said video recording apparatus so that said video signals reproduced by said video reproducing apparatuses are edited and recorded by said video recording apparatus in accordance with an edit decision list, said video editing apparatus comprising:

edit decision list setting means for setting said edit decision list showing identification data of recording media which are to be used for a video edit and an order of said recording media to be used for the video edit;

mounted recording media name memory means for storing identification data of recording media mounted on each of said plurality of video reproducing apparatuses;

unmounted recording media name displaying means for displaying names of unmounted recording media which are used in said edit decision list but are not mounted on said plurality of video reproducing apparatuses;

mounted recording media name displaying means for displaying both names of said plurality of video reproducing apparatuses and names of said mounted recording media which are mounted on said plurality of video reproducing apparatuses; and recording media setting means for selecting one of said unmounted recording media corresponding to a name displayed by said unmounted recording media name displaying means, for selecting one of said plurality of video reproducing apparatuses to mount the selected unmounted recording medium thereon, and for updating the identification data of the recording media stored in said mounted recording media name memory means in accordance with the selection of the unmounted recording medium and of the reproducing apparatus on which said unmounted recording medium is mounted.

9. A video editing system according to claim 8, wherein said unmounted recording media name displaying means and said mounted recording media name displaying means simultaneously display names on a single screen of the video editing system.

10. A video editing system according to claim 8, further comprising:

recording media storage means for storing a plurality of recording media;

transporting means for transporting a selected one of the plurality of recording media between one of said recording media storage means and one of said selected video reproducing apparatus and said video recording apparatus, and between two of said video reproducing apparatuses in accordance with said recording media setting means.

11. A video editing system according to claim 8, wherein said recording medium is a cassette tape.

* * * * *